United States Patent [19]

Banton

[11] 4,336,994
[45] Jun. 29, 1982

[54] MULTI-MODE COLOR COPIER
[75] Inventor: Martin E. Banton, Fairport, N.Y.
[73] Assignee: Xerox Corporation, Stamford, Conn.
[21] Appl. No.: 210,086
[22] Filed: Nov. 24, 1980
[51] Int. Cl.³ .......................................... G03G 13/01
[52] U.S. Cl. .......................................... 355/4; 355/8; 355/3 R; 430/43; 430/44; 118/655
[58] Field of Search ............... 355/4, 8, 3 R; 430/43, 430/44; 118/655

[56] References Cited

U.S. PATENT DOCUMENTS

| | | | |
|---|---|---|---|
| 4,111,151 | 9/1978 | Ruckdeschel | 355/4 X |
| 4,135,927 | 1/1979 | Draugelis et al. | 96/1.2 |
| 4,188,213 | 2/1980 | Lehman | 355/4 X |
| 4,236,809 | 12/1980 | Kermisch | 355/4 |
| 4,286,031 | 8/1981 | Kuehnle et al. | 355/4 X |

Primary Examiner—Arthur C. Prescott

[57] ABSTRACT

A multi-mode color copier having a photoreceptor for storing color separated images. The color copier includes a platen input for transmitting color images from an original to the photoreceptor, a raster output scanner for writing on the photoreceptor and a raster input scanner for reading developed color separated images from the photoreceptor. The input to the raster output scanner and the output from the raster input scanner are in the form of digitized video signals which correspond to the color separated images. In addition to outputting video signals through the raster input scanner the copier can create color copies by sequentially transferring developed images from the photoreceptor to a copy sheet and fusing those images to form a permanent color copy.

13 Claims, 3 Drawing Figures

MULTI-MODE COLOR COPIER

BACKGROUND OF THE INVENTION

1. Field of the Invention

The present invention relates to a color xerographic copier and more particularly relates to a multi-mode color copier having raster input and output scanning capabilities.

2. Prior Art

Color copiers are known in the art. U.S. Pat. No. 4,135,927 entitled "Multi-Color Xerographic Process" to Draugelis et al. discloses one such color copier. According to the copying techniques disclosed in the '927 patent, a charged photoconductive member is sequentially exposed to a series of color separations of a color original in order to form a plurality of latent electrostatic images. As disclosed in the '927 patent this separation is achieved by transmitting the original image through a number of filters which selectively transmit colors to the photoreceptor. Each color separated image is then developed with a complementary toner material, i.e., a developer material containing a colorant which is a substractive complement of the color transmitted through the filter. The developed image is then transferred to a copy substrate and the photoconductive member cleaned. The colored original is then again optically imaging using a different filter, developed using that filter's complementary toner and then transferred to the copy substrate. Once all primary colors have been separated and brought together on a sheet of support material, the colored toner materials are fused. This above-defined process is similar to conventional xerography since developed images are physically transferred from a developed photoconductor to a copy substrate.

Raster input scanning and raster output scanning are two modifications to conventional xerography which heretofore have not been readily adapted to color copying. Raster output scanning (ROS) involves the line by line scanning of a charged photoreceptor to encode or write information onto that photoreceptor. ROS techniques typically involve modulation of a laser output in a controlled manner to encode this information. The laser is selectively turned on and off as its beam traverses across a charged photoreceptor in a controlled manner so that selected portions of the photoreceptor can be discharged and certain other portions remain charged.

In so called raster input scanning (RIS) a scanning technique is used to read information using a laser beam. According to this technique, a laser beam is selectively scanned across a document so that photodiodes optically coupled to the document will be selectively illuminated by the document. Techniques are known in the art for then translating the output from the photodiodes into information corresponding to the information content of the scanned document. This information can be stored or directly coupled to a ROS system for writing the information with a ROS system.

Copending U.S. patent application Ser. No. 111,520 entitled "Multiple Function Reproduction Apparatus" to Kramer et al. discloses a multi-function copying system incorporating both RIS and ROS systems. In a first mode of operation the apparatus disclosed in that application functions as a conventional copier wherein an image of a document original is transferred to a photoreceptor, a latent image is developed and transferred to a copy sheet for subsequent fusing. In a second mode of operation a flying spot laser beam writes images on a charged photoconductive surface in response to imaging signals input to that system. In this mode of operation, the beam impinges on the photoconductive surface at a location upstream of a developing system so that the encoded information from the laser beam can be developed and subsequently transferred to a copy sheet. In a third so called read mode of operation a beam impinges on the photoconductive surface downstream from the developing device to scan images developed on the photoconductive surface. The light scattered from the surface is collected and converted to image signals representative of the image so scanned. This last, read mode of operation corresponds to conventional RIS scanning. Rather than scanning a document, however, the RIS technique is utilized to scan a developed photoreceptor image so that all three xerographic functions can be performed using a single apparatus.

SUMMARY OF THE INVENTION

The present invention extends the concept of multiple function copying to a color copier. Practice of the invention enables color raster input and output scanning to be combined with conventional color xerography to greatly expand color information transfer capabilities.

The multi-mode color copier of the present invention includes a photoconductive member for recording electrostatic latent images and further includes a number of processing stations for both generating and transferring color images. To enable color copying of a document original a filter transmits color separated images from the original to the photoconductive member. A number of colored toner materials (typically cyan, magenta and yellow) are then used to sequentially develop the color separated latent images so that those images can be transferred to a copy sheet.

The multi-mode copier further includes input and output scanning apparatus to expand information transfer capabilities of a conventional color copier. A raster input scanner is used to scan color separated developed images on the photoconductive member. The input scanner converts information regarding toner density for each of the multiple toners into video signals for storage or for immediate use with a raster output scanner having color capability. The present multi-mode copier has such a raster output scanner. Color separated video signals are used to controllably modulate a laser beam to selectively discharge the photoconductive member thereby creating color separated latent images. These latent images are then developed with the multiple colored toners and then transferred to a copy sheet.

The present system greatly enhances color copying flexibility. A colored original can be developed and scanned at one location and transferred to a copy sheet at a second location by transmitting the video signals from the first copier's RIS station to the second copier's ROS station. Both copiers also continue, of course, to have the capability of generating color copies using the conventional color copying steps of generating color separated images, developing those images and sequentially transferring the developed images onto a copy sheet.

The preferred embodiment of the invention utilizes an infrared laser to perform the raster input scanning. Unlike a visible light laser, the infrared laser can scan all three toner materials for density distributons. Electrical signals related to these distributions are then generated and stored to create a color separated mapping of the photoconductive member's surface. The same laser can be used for raster output scanning so long as the photoconductive member is sensitive to both visible and infrared light exposure so that color separated images can be stored on the photoconductive member from either an original document or the raster output scanner.

From the above it should be appreciated the one object of the invention is to provide a copier which in addition to conventional color xerography has a color raster input and output scanning capability. This and other objects and advantages of the invention will be become better understood when a detailed description of the invention is considered in conjunction with the accompanying drawings.

DETAILED DESCRIPTION OF THE PREFERRED EMBODIMENT

There is shown herein a multi-mode color reproduction apparatus operable selectively in a copy mode to xerographically make color copies of original documents in the manner typical of xerographic copiers or machines, in a write mode to xerographically produce copies from image signals input thereto using a flying spot type scanner, and in a read mode to read images developed on the machine photoreceptor with the same flying spot scanner to produce color image signals representative thereof and thereby convert the image to electronic signals.

Figure 1:
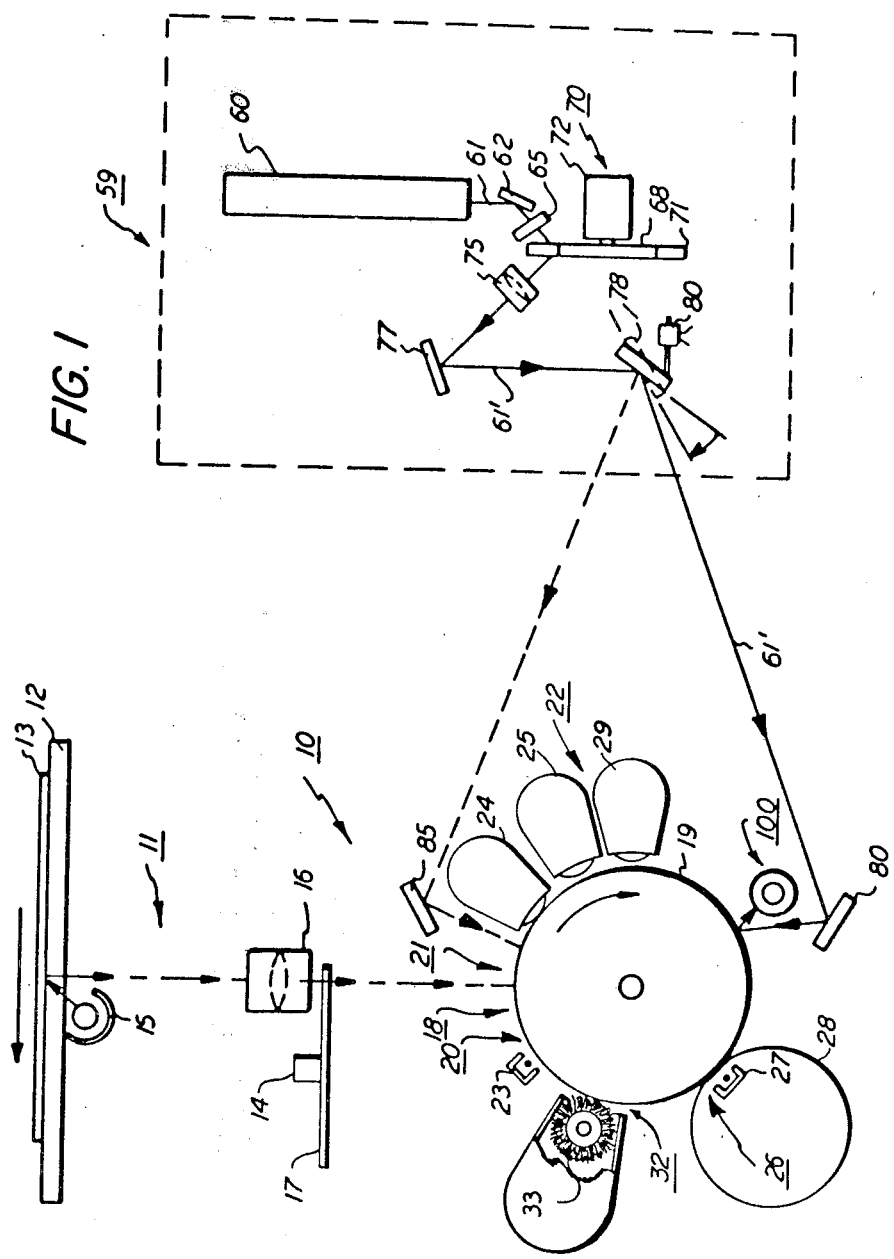
FIG. 1 is a schematic view showing an exemplary apparatus for carrying out multiple function color image processing in accordance with the teachings of the present invention.
Figure 2:
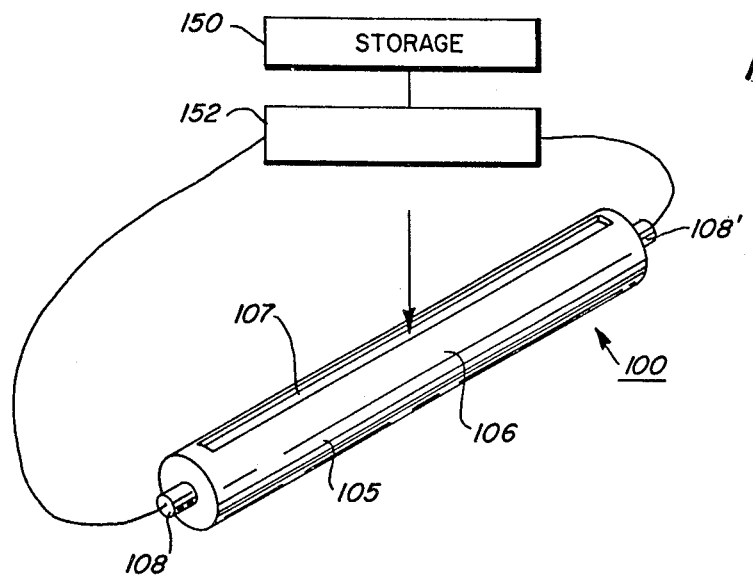
FIG. 2 is an isometric view showing details of a sensor used in the FIG. 1 apparatus.

Referring now particularly to FIGS. 1 and 2 of the drawings, there is shown an exemplary xerographic type reproduction apparatus 10 incorporating the present invention. Xerographic reproduction apparatus 10 includes a viewing station or platen 12 where document originals 13 to be reproduced or copied are placed. For operation in the copy mode as will appear more fully herein, a light/lens imaging system 11 is provided, the light/lens system including a light source 15 for illuminating the original 13 at platen 12 and a lens 16 for transmitting image rays reflected from the original 13 to the photoconductive surface through a filter 17 to a surface 19 of drum 18 at exposure station 21.

Charging, developing, transfer, and cleaning stations 20, 22, 26, 32 respectively are disposed about drum 18 in operative relation thereto. Charging station 20 includes a corona charging means 23 for depositing a uniform electrostatic charge on the photoconductive surface 19 of drum 18 in preparation for imaging.

The developing station 22 comprises three developer material dispenser 24, 25, 29 which selectively dispense different colored toner onto the charged photoconductive surface 19. As noted in U.S. Pat. No. 4,135,927 (incorporated herein by reference) the dispensers 24, 25, 29 contain yellow, cyan (blue green) and magenta (red) toner materials.

At transfer station 26, corona transfer means 27 effects transfer of the developed image to a suitable copy sheet supported on a rotating drum 28. A suitable cleaning device such as a rotating cleaning brush 33 is provided at cleaning station 32 for removing leftover developing materials from the surface 19 of drum 18. Brush 33 may be disposed in an evacuated housing through which leftover developer materials removed from the drum surface by the cleaning brush are exhausted. Drum 18 is supported for rotation by suitable bearing means (not shown). A suitable drive motor (not shown) is drivingly coupled to drum 18 and rotates drum 18 in the direction shown by the solid line arrow when processing copies.

When operating in the copy mode, the photoconductive surface 19 of drum 18 is charged to a uniform level by corona charging means 23. Platen 12 and the original document 13 thereon are irradiated by light source 15, the light reflected from document 13 is focused onto the photoconductive surface 19 of drum 18 by lens 16 at exposure station 21. The filter 17 is adjusted to selectively transmit only a portion of the visible spectrum. Platen 12 and the document 13 thereon are at the same time moved in synchronism with rotation of the drum 18. The light reflected from the original 13 and transmitted through the filter 17 selectively discharges the charged photoconductive surface in a pattern corresponding to the color content of the image that comprises the original document.

The latent electrosatic image created on the surface 19 of drum 18 is developed by a selected one of the dispensers 24, 25, 29 and transferred to a copy sheet through the action of transfer corona means 27. As illustrated in FIG. 1 only one of the dispensers at any one time engages the drum 18. Following transfer, the photoconductive surface 19 of drum 18 is cleaned by cleaning brush 33 to remove leftover developer material. The filter 17 is then repositioned and subsequent image portions in the visible spectrum are transferred to the photoconductive surface for development. After an entire composite image is transferred to the copy sheet, a suitable fuser or fixing device (not shown) fixes the image transferred to the copy sheet to render the copy permanent.

While a drum type photoconductor is illustrated other photoconductor types such as belt, web, etc. may be envisioned. While a scan type imaging systm is illustrated, other types of imaging systems such as full frame flash, may be contemplated.

The photoconductor may be opaque, that is, impervious to light, or wholly or partially transparent. The exemplary drum 18 typically has an aluminum substrate which renders the drum opaque. However, other substrate materials such as glass may be contemplated, which would render the drum 18 wholly or partially transparent. One material consists of an aluminized mylar substrate having a layer of selenium dispersed in poly-N-vinyl carbazole with a transparent polymer overcoating containing a charge transparent compound such as pyrene.

The xerographic reproduction apparatus 10 includes a flying spot scanner 59. Scanner 59 has a suitable source of electro-magnetic radiation such as an infrared laser 60. The laser 60 comprises a laser diode for generating infrared radiation and beam forming optics for directing a beam 61 of such radiation to a mirror 62 which in turn directs the beams to a deflector unit 70. An infrared laser source is used since the infrared radiation is absorbed by all three toners deposited by the developing station 22 and can, therefore, detect toner density in the read mode of operation. In the write mode of operation the laser diode can be rapidly switched on and off to encode the beam 61 with information contained in image signals so the beam 61 writes that information on the drum surface 19. If the scanner 59 comprises a laser other than a directly modulatable one the switching on and off of the beam 61 is accomplished with a modulator 65. Modulator 65 may comprise any suitable modulator, such as acousto-optic or electro-optic type modulators for imparting the informational content of the image signals input thereto to beam 61.

Beam 61 is diffracted by disc deflector 68 of a holographic deflector unit 70. Deflector 68 comprises a substantially flat disc-like element having a plurality of grating faces or facets 71 forming the outer periphery thereof. Deflector 68 which is preferably glass, is driven by motor 72. Preferably, deflector 68 is disposed so that light beam 61 is incident to the facets 71 thereof at an angle of substantially 45°. The diffracted scanning beam 61' output by deflector 68 exits at a complementary angle. Other scanning means such as rotating polygonal mirrors also can be used to direct the beam 61 to the drum.

The scanning beam 61' output by deflector 68 passes to an imaging lens 75. As shown, lens 75 is located in the optical path between deflector 68 and mirror 77, lens 75 being of a diameter suitable to receive and focus the scanning light beam diffracted by facets 71 of deflector 68 to a selected spot in the focal plane proximate the drum surface 19.

A read/write control mirror 78 is supported for limited movement between a read position (shown in solid line in the drawing) and a write position (shown in phantom in FIG. 1). A suitable driving mechanism such as solenoid 80 is provided to selectively move the mirror 78 from one position to the other. Return spring means (not shown) may be provided to return mirror 78 to the original position upon de-energization of solenoid 80.

In the copy mode, latent electrostatic images are formed on the photoconductive surface 19 of drum 18 through exposure of the document 13 on platen 12 as described heretofore. In the write mode, latent electrostatic images are created on the charged photoconductive surface 19 of drum 18 by means of the flying spot scanner 59 in accordance with image signals input thereto. In this mode, solenoid 80 is energized to move control mirror 78 to the write position (the dotted line position shown in FIG. 1). In this position, mirrors 78, 85 cooperate to reflect scanning beam 61' to a point on the surface 19 of drum 18 upstream of developing station 22. The laser 60 modulates the light intensity of scanning beam 61' in accordance with the content of the image signals input thereto so that scanning beam 61' dissipates the electrostatic charge on the drum surface to create a latent electrostatic image representative of the image signals input thereto. The electrostatic latent image so created corresponds to a particular primary color and is thereafter developed by an appropriate one of the three toner materials and transferred to a copy sheet on the drum 28 by corona transfer means 27 at transfer station 26. Following transfer, the surface of drum 18 is cleaned by cleaning brush 33 as described and other primary color images are likewise transmitted to drum 18, developed, and transferred.

In this mode, and in the image read mode, deflector 68 is continually driven at substantially constant velocity by motor 72. In the write mode, the image signal source is controlled so as to be synchronized with rotation of deflector 68. The rotational rate of xerographic drum 18 which determines the spacing of the scan line, is preferably synchronized to the signal source in order to maintain image linearity.

In the image read mode, where it is desired to read original 13 and convert the content thereof to color image signals, solenoid 80 is de-energized to place control mirror 78 in the read position (the solid line position shown in FIG. 1). In this position, mirror 78 cooperates with mirror 80 to reflect the scanning beam 61' to the surface 19 of drum 18 at a point downstream of developing station 22. As a result, scanning beam 61' scans across the surface of drum 18 and any image developed thereon.

In the case where the photoconductive material is opaque, light impinging on the surface 19 of drum 18 is scattered. In the case where the photoconductive material is transparent, the light is transmitted, depending on the degree of transparency of the photoconductive material through the photoconductive material to the drum interior. As will be understood, scattered light is composed of both specular and diffuse reflected light while transmitted light is composed of specular and diffuse transmitted light. The scattered or transmitted light from the photoconductive surface 19 of drum 18 and the developed image thereon is sensed by a detector 100, and there converted to image video signals.

Referring particularly to FIG. 2, detector 100 consists of elongated hollow cylindrical housing 105 disposed adjacent and in predetermined spaced relationship to the surface 19 of drum 18, housing 105 being supported such that the longitudinal axis of housing 105 substantially parallels the axis of drum 18. Housing 105 is provided with an elongated slit-like aperture 107 in the wall thereof opposite the photoconductive surface 19 of drum 18, housing 105 being located such that light scattered from the drum surface and the developed image thereon passes through aperture 107 into the interior 106 of housing 105. A pair of photodetectors 108, 108' are provided in housing 105 at the ends thereof, photodetectors 108, 108' generating signals in response to the presence or absence of light. To enhance the light responsiveness of housing 105, the interior wall 107 thereof is preferably finished with a highly reflective material such as a highly reflective lambertian coating. While a collecting cavity is utilized in the preferred embodiment, other collecting techniques known in the scanning art could be utilized.

It will be understood that where the photoconductive material is transparent, detector 100 is suitably supported within the interior of drum 18 to receive light transmitted through the photoconductive material.

A full color separation of an original document 13 is performed by making three sequential toned imaged of that document. Requirements for full color separation capability are that the surface 19 and document illuminator 15 are matched to provide good color copyability across most of the visible spectrum and that the filter wheel 17 contains three filters to separate out the primary (red,green,blue) colors.

Figure 3:
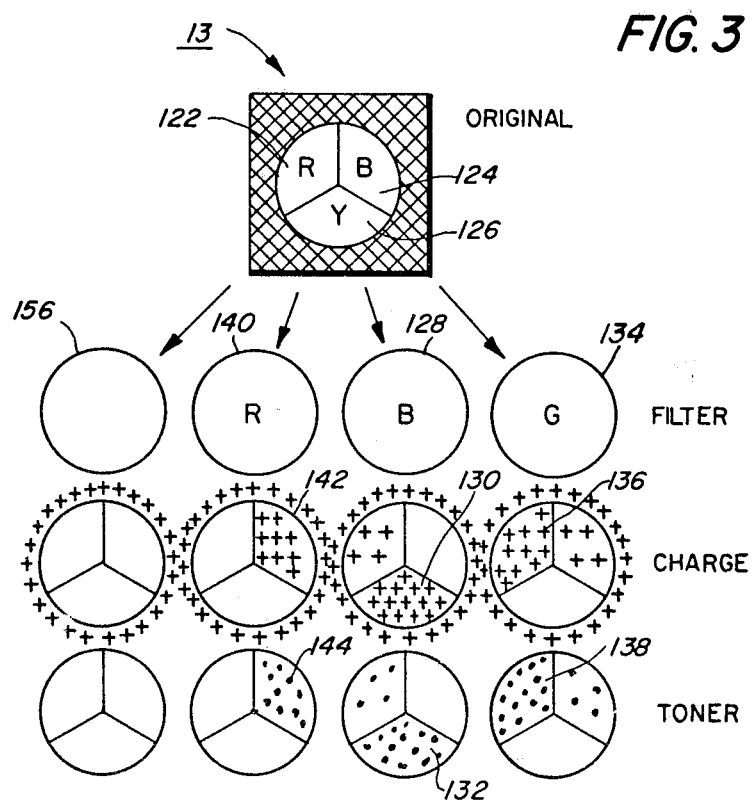
FIG. 3 is a schematic showing a sequence of scanning steps in creating color images according to the invention.

The color separation process is described in relation to FIG. 3 where a document 13 having red 122, blue 124 and yellow 126 regions on a black background is illustrated. The electrostatographic preparation of a color copy using the support drum 28 and copy sheet involves formation of three light images, each image representing the proportionate amount of a colored toner to be used in developing the photoconductive surface 19.

Color separation is effected through the absorption and transmission characteristics of the colored regions 122, 124, 126 printed on the original 13. The yellow region 126 reflects almost as much red and green light from the lamp 15 as does white paper, but almost completely absorbs blue. Thus, yellow controls where blue reflects from the original 13. A blue filter 128 is therefore a correct filter to use to provide correct filter separation tone values for a yellow toner. The charged photoconductor drum 18 remains charged in a region 130 corresponding to the yellow region 126 on the original. When a positive is developed with toner 132 from this negative, it will be a record of the minus-blue (yellow) area of the original 13. In a conventional copying mode the toner 132 will be yellow.

The red (magenta) colored region 122 on the original 13 absorbs green light from the lamp 15 without substantially disturbing the reflectance of the red and blue light. A green filter 134 on the wheel 17 is accordingly rotated into position to transmit reflections from the original 13 when red areas are to be recorded. In the illustration (FIG. 3) the green filter 134 results in a charge pattern 136 corresponding to the originals red region 122. In conventional color copying this pattern 136 is developed with a magenta toner 136 to record the minus green or red area 122 of the original.

The blue (cyan) region 124 of the original absorbs red light while reflecting green and blue light. A red filter 140 is thus rotated into position between the document 13 and the drum 18 when the blue region 124 is developed. A charge pattern 142 corresponding to the minus red or blue area 124 results which is then developed with a blue or cyan toner 144. After each toner 132, 138, 144 is sequentially transferred to a copy sheet on the drum 28 the image is fused and results in a permanent color reproduction of the original.

In the read mode of operation the sequence of steps for recording color information is similar. As in the above example such image would be formed with the aid of one of the primary color separation filter 128, 134 and 140. The three toned images would be sequentially laser scanned by the beam 61' rather than transferred to the copy sheet. The information regarding the toned image (i.e. presence of toner, lack of toner, or intermediate toner density) is then stored in a storage device 150 such as a computer on can be transmitted directly to a color ROS machine for generating full color copies.

It should be appreciated that during the read mode the output of the photodiodes 108, 108' is a measure of the toner density on the drum. So long as the toner absorbs the radiation from the scanning laser a low diode output is indicative of a high toner density in the region scanned and a high diode output corresponds to a low toner density. This diode output is analyzed by circuitry 152 to provide electrical video signals corresponding to the developed image on the drum 18. By so analyzing the entire exposed photoconductive surface a mapping of video signals corresponding to the image can be generated and stored for each incremental area or pixel.

To scan the images developed on the photoreceptor the laser beam 61' must read all three colored toners with good contrast. Use of a semiconductor infrared laser with an output having a wavelength of about 850 nanometers satisfies this condition. To use this laser in the write mode, it is necessary that the surface of the drum 19 be sensitive to infrared radiation. Either a selenium alloy such as SeTe or an organic photoreceptor having a vanodyl phthalocyanine layer will respond to such a laser.

Examplary photodectors 108, 108' comprise United Detector Technology Pin 10d silicon photodiodes or equivalent large area diodes. The circuitry 152 converts the diode current to a voltage related to the current and outputs that voltage to the storage device 150. The circuitry 152, for example, might comprise a high impedance FET input operational amplifier having its two inputs coupled to across the photodiode and having an output coupled to a storage capacitor through a switch. The voltage on the capacitor is proportional to the radiation intensity reflected from the photoreceptor for the time period in which the switch is closed. Suitable analog to digital conversion techniques can then convert the analog capacitor voltage to a digital input to the storage device 150.

While a preferred multi-mode copier has been described with a degree of particularity it should be appreciated that modifications could be made to the disclosed design without departing from the spirit or scope of the appended claims. It is the intent that all such modifications be covered by the present invention.

I claim:

1. A multi-mode color copier having a photoconductive member defining multiple picture elements for recording electrostatic images, said copier comprising:
   (a) multiple filter means for transmitting multiple color separated images from an original to the photoconductive member,
   (b) multiple developer means for developing picture elements on said photoconductive member, one of said multiple developers for developing each of said multiple color separated images,
   (c) means for sequentially transferring developed color separated images from said photoconductive member to a copy sheet to form a composite color image on said copy sheet,
   (d) scanning input means for scanning color developed picture elements comprising said photoconductive member and generating color separated video signals for each of said picture elements, and
   (e) scanning output means for creating color separated latent images on said photoconductive member for development by said multiple developer means prior to transfer to copy sheet by said means for transferring or prior to scanning by said scanning input means.

2. The copier of claim 1 wherein said multiple developer means comprises means for dispensing yellow, cyan, and magenta toner materials for forming said composite color image and wherein said scanning input means comprises an infrared laser for distinguishing the presence or absence of each of said toner materials on said photoconductive member.

3. The copier of claim 1 or 2 where both said scanning input means and said scanning output means comprise an infrared laser.

4. In a copying apparatus having a photoreceptor, means to charge said photoreceptor in preparation for imaging, exposure means for exposing said charged photoreceptor to produce latent electrostatic images, developing means for developing the images, and transfer means for transferring said developed images to copy substrate material, the improvement comprising means for selectively chromatic filtering images from said exposure means, means for scanning successive filtered picture elements of said images developed on said photoreceptor to provide image signals representative of said successive picture elements and means for interpreting said image signals to provide color image signals for each of said picture elements.

5. The copying apparatus of claim 4 wherein said developing means comprises a plurality of colored toners for sequentially developing said successive filtered images to create a color image for transfer to said copy substrate material.

6. The apparatus of claim 4 or 5 wherein said means for scanning comprises a laser having a substantially monochromatic output which is absorbed by and therefore capable of detecting the presence of each of said plurality of colored toners.

7. A method for generating color separated video image signals for multiple incremental picture elements of a color original using a xerographic copier comprising the steps of:
(a) selectively transmitting a portion of the visible spectrum to a photoreceptor to create a first latent image;
(b) developing said first latent image with a development material complementary to said portion to form a visible image whose information content depends on the portion of the visible spectrum transmitted;
(c) scanning the multiple incremental picture elements of said visible image with scanning means having a light source whose wavelength is absorbed by said material to produce video signals related to the developed image for each multiple picture element; and
(d) repeating said transmitting, developing, and scanning steps for other portions of the visible spectrum.

8. The method of claim 7 where the transmitting step is performed by selectively scanning a light signal to which the photoreceptor is sensitive across incremental areas on said photoreceptor to create said first latent image.

9. The method of claim 7 where the transmitting step is performed by reflecting a light image from a document original to said photoreceptor.

10. A multi-mode xerographic apparatus comprising xerographic photoconductive surface responsive to light images from an original by maintaining a latent electrostatic image on said light images on said surface, means for transmitting color separated light images to said photoconductive surface, means for developing said color separated images with a complementary color toner material to render said latent images, means for transferring multiple color separated toner images to create a composite color copy which when fused provides a substantially permanent color copy of said original, means for scanning a plurality of incremental areas on said photoconductive surface with means sensitive to the density of the toner image on said surface to obtain a density mapping of said incremental areas, and means for converting the density mapping for each area into a video signal for storage or transmittal.

11. The xerographic apparatus of claim 10 which further comprises input scanning means for encoding incremental areas of said photoconductive surface with a light signal and means for modulating said light signal to impose a color separated image at each area to form a composite color separated image on said surface.

12. The xerographic apparatus of claim 11 wherein both said means for scanning and said input scanning means comprise a laser suitable for generating a wavelength light to which the photoconductive surface is sensitive.

13. The apparatus of claim 12 wherein said means for scanning comprises a detector responsive to light reflected from said areas as said laser scans said areas.

* * * * *